United States Patent Office 3,210,264
Patented Oct. 5, 1965

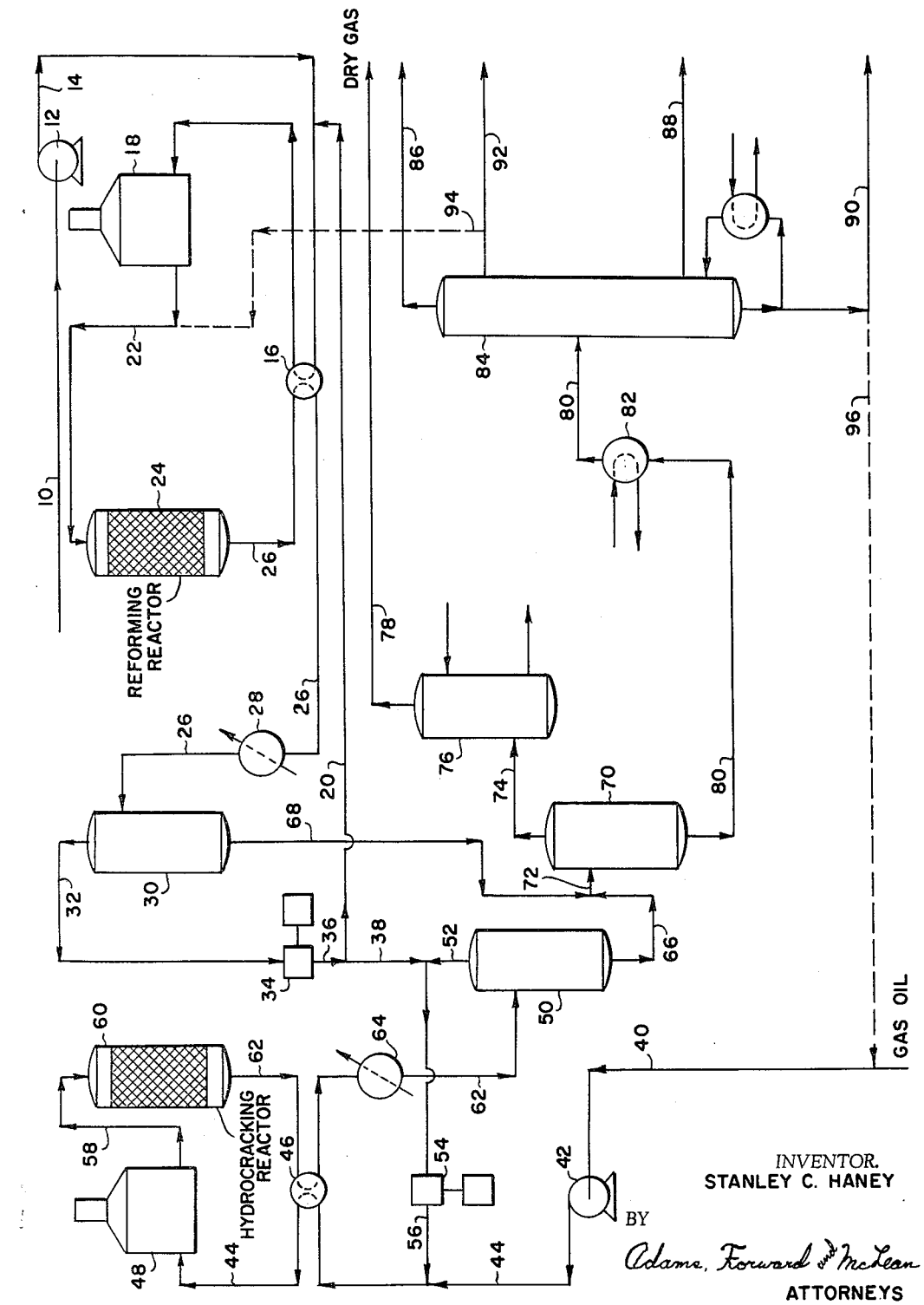

3,210,264
COMBINED PROCESS FOR HYDROCRACKING
GAS OIL AND REFORMING NAPHTHA
Stanley C. Haney, Riverdale, Ill., assignor to Sinclair Research, Inc., New York, N.Y., a corporation of Delaware
Filed May 7, 1962, Ser. No. 192,713
5 Claims. (Cl. 208—79)

This invention relates to a combined hydrocracking and reforming process.

One of the problems confronting the chemical process industry today is the high cost of obtaining high purity hydrogen. Compounding this problem is the fact that the requirements for high purity hydrogen are ever increasing. It has been estimated that hydrogen consumption in this country will double during the course of the next five years. Inasmuch as the presently known sources of low cost hydrogen are being exploited to their maximum, it appears that the problem will worsen as time goes on rather than lessen. Another problem specifically confronting the petroleum refining industry is that of optimizing yields from hydrocracking reactions and reforming reactions, both of which require the presence of high purity hydrogen, without increasing the cost of operating such processes.

The present invention provides an integrated processing sequence whereby gas oil and naphtha stocks are processed under optimum conditions for the most advantageous use of the hydrogen available in the naphtha to upgrade the gas oil.

My invention comprises a combined process for hydrocracking gas oil, preferably light straight run gas oil, and reforming naphtha, preferably light straight run naphtha. In my combined process the naphtha is contacted, preferably in a single reactor, with a carrier based platinum metal reforming catalyst in the presence of hydrogen rich recycle gas from the reforming reaction under reforming conditions of temperature, pressure, weight hourly space velocity, and hydrogen feed rate. The reaction effluent from the reforming reaction is separated into a liquid reformate stream and a hydrogen-rich gas stream consisting essentially of hydrogen and $C_1$ to $C_2$ alkanes. A portion of this hydrogen-rich gas stream is recycled to the reforming reaction. A gas oil is contacted with a hydrocracking catalyst in the presence of hydrogen-rich hydrocracking recycle gas and a substantial portion of the hydrogen-rich gas stream from the reforming reaction. This contacting takes place under hydrocracking conditions of temperature, pressure, weight hourly space velocity and hydrogen feed rate in order to form a hydrocracking effluent stream. The effluent stream from the hydrocracking reaction is separated into a liquid hydrocracked stream and a hydrogen-rich gas stream consisting essentially of hydrogen and $C_1$ to $C_2$ alkanes which gas stream is recycled to the hydrocracking reaction. The liquid hydrocracked stream is combined with the liquid reformate stream and this combined stream is then flashed at reduced pressure to form a flash liquid stream and a flash gas stream. The flash gas stream is subjected to absorption to produce a dry gas containing propane and lighter components which is a source of liquified petroleum gas after further treatment to remove the desirable components. The flash liquid stream is fractionated to obtain an overhead fraction boiling primarily in the range from the $C_4$ boiling range up to about 350° F., a sidestream boiling primarily in the range from about 350° F. to 525° F., and a bottoms fraction. The composition of the sidestream and the bottoms fraction can be varied to provide a variety of high quality products. For example the fraction boiling in the $C_4$ to 350° F. range obtained from the fractionation can be sent to a debutanizer and after removal of butanes can be blended into regular grade gasoline without further treatment or further fractionated into suitable stock for gasoline blending and/or reforming feed stock. A fraction having an ASTM boiling range from 350 to 525° F. can be removed as a sidestream and employed for gas-turbine aircraft fuel. The 525° F. + end point stock can be blended into #2 heating oil. Alternatively, a 350° to 460° F. ASTM fraction can be removed as a sidestream from the fractionation step and sent directly to the reforming reaction in order to increase hydrogen production. When such alternative is employed, a 460° F. + bottoms can be directed to #2 heating oil or can be recycled to the hydrocracking reaction for a greater production of lighter boiling products.

The gas oil charged to the hydrocracking step is preferably a light straight run gas oil boiling primarily within the range from about 460° to about 650° F. Advantageously, the gas oil contains less than 50 parts per million by weight of nitrogen and preferably less than 30 parts per million by weight of nitrogen. The particular conditions employed in the hydrocracking reaction are those which are well known in the art. Thus, the temperature can be in the range from about 400 to 700 or 950° F., the pressure can be in the range from 500 to 2500 p.s.i.g., a weight hourly space velocity from 0.1 to 20.0 can be employed, and the mole ratio of hydrogen gas to hydrocarbon stock can be in the range from 2 to 100:1. The catalyst employed in the hydrocracking reaction can be any of the hydrocracking catalysts well known in the art such as oxides, sulfides, or halides of the Group VI B metals (chromium, molybdenum, tungsten) and/or elements with atomic numbers between 26 through 28 from Group VIII including the iron transition elements (iron, cobalt and nickel) unsupported or supported either on a silica-alumina base or on a precious metal-boria-alumina base. The platinum group metals such as platinum, palladium, rhodium and iridium can also be employed as catalyst promoters. While the hydrocracking reaction of my process is operable within the ranges of operating conditions listed above and employing any one of the catalysts described above, it is preferred to conduct the hydrocracking reaction at a temperature of 500 to 860° F., a pressure 500 to 1500 p.s.i.g., a weight hourly space velocity of 1.0 to 5.0 and a mole ratio of hydrogen to hydrocarbon charge stock of 5 to 20:1 while employing a nickel sulfide on a silica-alumina base catalyst.

The reforming reaction of my process can be conducted in a single reforming reactor which can be either an adiabatic reforming reactor or an isothermal reforming reactor. While any of the well known types of adiabatic or isothermal reactors can be employed, it is preferred to employ a single adiabatic reforming reactor of the type described in application Serial No. 192,876, filed May 7, 1962, of M. H. Dalson et al. An isothermal reactor of the type described in application Serial No. 192,856, filed May 7, 1962, of W. H. Decker can also be employed. When employing a single adiabatic reactor of the type described by Dalson et al., the hydrocarbon fraction can be charged to a reaction zone containing a fixed bed of carrier based platinum metal catalyst under reforming conditions including a temperature from about 900° to about 980° F., a pressure from about 150 to about 250 p.s.i.g., a weight hourly space velocity from about 15 to about 30, and a mole ratio of hydrogen to hydrocarbon fraction from about 2:1 to about 4:1. When employing a single isothermal reactor of the type described by Decker, the hydrocarbon fraction can be charged to a reaction zone containing a fixed bed of a carrier based platinum metal catalyst sized so that the ratio of length of catalyst bed to diameter of catalyst bed is from about 150:1 to about 20:1. The reaction conditions employed include a temperature from about 800° to about 1000° F., a pressure from about 150 to about 750 p.s.i.g., a weight hourly space velocity from about 2 to about 30 and a mole ratio of hydrogen to hydrocarbon from about 2:1 to about 10:1. Also, any of the well known reforming catalysts can be employed in the reforming reaction of my process. For instance, I find it advantageous to employ catalysts which consist essentially of a carrier-based platinum group metal and generally have a platinum group metal content of 0.1 to 2.0 percent by weight. Suitable carriers are of the refractory oxide type and include alumina especially activated alumina, silica, boria, zirconia, magnesia, and combinations of these refractory oxides. Preferred carriers contain alumina alone or as the major component and can include components which react with alumina to form an acidic catalyst, such as chlorine, silica, boria, and the like. The platinum group metal of the catalyst is the essential component and these metals include for instance platinum, palladium, rhodium and iridium. A particularly advantageous catalyst which can be employed is a supported platinum catalyst containing for instance about 0.3 to 1.0 percent by weight platinum and the support is alumina characterized for instance by high surface area and/or enlarged pore size. Such catalysts can be conveniently prepared as described in U.S. Patents Nos. 2,838,444 and 2,838,445.

In order to illustrate the combined process of my invention more completely, reference is made to the following example which should be read with reference to the schematic flow diagram shown in the attached drawing.

EXAMPLE

In this example a light straight run naphtha stock is employed in the reforming step. The inspection of this stock is shown in Table I.

*Table I*

ASTM distillation:
| | |
|---|---|
| Gravity, °API | 77.2 |
| IBP, ° F. | 96 |
| 10%, ° F. | 119 |
| 50%, ° F. | 144 |
| 90%, ° F. | 185 |
| EP, ° F. | 211 |
| RVP, Lbs. | 10.35 |

Inspections:
| | |
|---|---|
| Sulfur, wt. percent | 0.013 |
| Arsenic, ppb. | 5 |
| Lead, ppb. | 4 |
| Nitrogen (total), wt. percent | 0.000 |
| Nitrogen (basic), wt. percent | 0.0000 |
| Motor method clear | 68.2 |
| Motor method + 3 cc. | 86.6 |
| Research method clear | 68.4 |
| Research method + 3 cc. | 86.1 |

MSTA analysis ($C_6+$): Vol. percent
| | |
|---|---|
| Paraffins | 62.7 |
| Naphthenes | 34.7 |
| Benzene | 1.3 |
| Toluene | 1.1 |
| $C_8$ Aromatics | 0.1 |
| $C_9$ Aromatics | 0.1 |
| $C_{10}$ Aromatics | |

Component analysis:
| | |
|---|---|
| Isobutane | 0.02 |
| n-butane | 2.73 |
| Isopentane | 12.77 |
| n-pentane | 19.40 |
| Methylcyclopentane | 7.65 |
| Cyclohexane | 4.45 |
| Dimethylcyclopentanes | 3.90 |
| Methylcyclohexane | 2.60 |

*Table I*—Continued

Component analysis:
| | |
|---|---|
| Ethylcyclopentanes | 0.17 |
| Benzene | 0.68 |
| Toluene | 0.54 |
| $C_6+$ Paraffins | 45.09 |

A stream of this light straight run naphtha flowing at the rate of 13,200 barrels per day is passed by means of line 10, pump 12 and line 14 through heat exchanger 16 and into heater 18. Before entering heat exchanger 16, the naphtha stream of line 14 is admixed with hydrogen-rich recycle gas which is introduced into line 14 by means of line 20 at the rate of 3 moles of hydrogen per mole of naphtha. The combined stream of naphtha and hydrogen-rich recycle gas is passed from heater 18 by means of line 22 and introduced into reforming reactor 24 at a temperature of 940° F. In reactor 24 the combined naphtha and hydrogen-rich recycle gas is contacted with about 9750 pounds of a fluoride-free platinum-alumina catalyst produced in a commercial plant which manufactures the catalyst of U.S. Patent 2,838,444 containing approximately 0.6 weight percent platinum in the form of one-sixteenth inch extrudates at a pressure of 200 p.s.i.g. and a space velocity of 15 pounds of naphtha per pound of catalyst per hour. The effluent from reactor 24 is removed by means of line 26 and passed through heat exchanger 16 and then to cooler 28 where it is cooled to approximately 100° F. The effluent stream of line 26 is then introduced into flash drum 30 where it is flashed at essentially reforming pressure (approximately 200 p.s.i.g.). A hydrogen-rich gas stream consisting essentially of hydrogen and $C_1$ to $C_2$ alkanes is removed from flash drum 30 by means of line 32. The hydrogen-rich stream of line 32 is compressed to essentially reformer reactor pressure (approximately 200 p.s.i.g.) by means of compressor 34. The compressed hydrogen-rich stream leaving compresser 34 by means of line 36 is split such that a portion of such hydrogen-rich gas stream is removed by means of line 20 and is admixed with the incoming naphtha charge stock as explained above. The other portion of the hydrogen rich gas stream is removed by means of line 38.

In this example a light straight run gas oil is employed in the hydrocracking step. The inspection of this stock is shown in Table II.

*Table II*

ASTM distillation:
| | |
|---|---|
| Gravity | 37.3 |
| IBP | 402 |
| 10 | 502 |
| 50 | 602 |
| 90 | 642 |
| EP | 649 |

Inspections:
| | |
|---|---|
| Sulfur, wt. percent | 0.05 |
| Nitrogen, wt. percent | 0.0010 |
| Aniline point, ° F. | 178.5 |
| Bromine No. | 0.7 |
| Pour point, ° F. | +30 |

A stream of this light straight run gas oil flowing at the rate of 5000 barrels per day is passed by means of line 40, pump 42 and line 44 through heat exchanger 46 and introduced into heater 48. Prior to its passage through heat exchanger 46 the gas oil stream of line 44 is comingled with recycle gases from a high pressure hydrocracking effluent flash drum 50 and the reforming effluent from flash drum 30. The effluent from drum 50 is introduced into line 38 carrying effluent from drum 30 by means of line 52 and this combined gas stream is compressed to hydrocracking pressure (approximately 1000 p.s.i.g.) by means of compressor 54 and then introduced into line 44 by means of line 56. The combined gas oil stream and recycle gas stream is removed from heater 48 at a temperature of 700° F. by means of line 58 and then introduced into hydrocracking reactor 60. The combined stream of line 58 is contacted with about 18,500 pounds of a hydrocracking catalyst having the following analysis: nickel sulfide 4.0 wt. percent; alumina 12 wt. percent and the balance silica. This contacting is effected in reactor 60 at a pressure of 1000 p.s.i.g., a space velocity of 3 pounds of gas oil per pound of catalyst per hour and a hydrogen feed rate of 15 moles of hydrogen per mole of gas oil.

The effluent from the hydrocracking reaction is removed from reactor 60 by means of line 62 and is then passed through heat exchanger 46 and cooler 64 where such stream is cooled to approximately 100° F. This cooled effluent stream of line 62 is then introduced into flash drum 50 where it is flashed at essentially hydrocracking reactor pressure. A stream of hydrogen containing gas from the high pressure hydrocracking flash drum 50 is removed by means of line 52 and combined with the hydrogen-rich gas stream of line 38 as explained above. A liquid hydrocracked stream is removed from flash drum 50 by means of line 66. The liquid stream of line 66 is combined with the liquid stream removed from the reforming flash drum 30 by means of line 68 and this combined stream is introduced into a reduced pressure flash drum 70 by means of line 72.

The flash gases from flash drum 70 are removed by means of line 74 and passed to absorber 76. Removed overhead from absorber 76 by means of line 78 is a dry gas stream containing propane and lighter components flowing at the rate of 365 barrels per day fuel oil equivalent (FOE).

A liquid stream is removed from low pressure flash drum 70 by means of line 80, passed through heater 82 and then introduced into fractionation tower 84. An overhead stream boiling primarily within the range from the $C_4$ boiling range up to about 350° F. is removed from tower 84 by means of line 86 at the rate of 16,478 barrels per day. This stream is passed to a debutanizer not shown. Another fraction boiling primarily within the range from 350° to 525° F. is removed from fractionator 84 by means of line 88 at the rate of 530 barrels per day. This stream is passed to gas-turbine aircraft fuel storage not shown. A bottoms fraction having a 525° F. + end point is removed from fractionator 84 by means of line 90 at the rate of 660 barrels per day. This fraction is passed to No. 2 heating oil storage not shown.

Alternatively, a fraction boiling primarily in the range from 350° to 460° F. can be removed from tower 84 by means of line 92. This stream can be sent directly to reforming reactor 24 by means of line 94 which, as shown in the drawing, connects with line 22 immediately before entrance into reactor 24. Introduction of this stream into the reforming reactor 24 substantially increases hydrogen production in the reforming reaction. When the 350–460° F. fraction is removed from tower 84 by means of line 92 a 460° F. + bottoms fraction can be sent directly to the No. 2 heating oil storage or alternatively can be recycled to the hydrocracking section by means of line 96 which as shown in the drawing connects directly with line 40.

The following table illustrates the quality of products obtained from the combined operation of my invention.

| Product | Gasoline | Jet Fuel | No. 2 Heating Oil |
|---|---|---|---|
| Gravity, ° API | 60.2 | 44.0 | 38.8 |
| Research, ON (Clear) | 72.6 | | |
| Research, ON + 3cc TEL | 89.9 | | |
| RVP | 4.6 | | |
| Sulfur, wt. percent | 0.001 | 0.003 | 0.005 |
| Nitrogen, wt. percent | | 0.000 | 0.0003 |
| Pour Point, ° F | | | +10 |
| Freezing Point, ° F | | −68 | |
| Smoke Point, mm | | 30 | |

Thus, it can be seen that the process of my invention effectively upgrades a low quality gas oil stock by means of hydrocracking without the requirement of introducing external hydrogen. Simultaneously, the octane number of a naphtha stock is enhanced by means of reforming under conditions designed to optimize hydrogen production for use in hydrocracking. Furthermore, the reforming step can be carried out in a single reactor thereby reducing the capital expenditure required to establish an integrated reforming-hydrocracking system in accordance with my invention.

I claim:

1. A combined process for hydrocracking gas oil, boiling in the range of about 460 to 650° F. and reforming naphtha, boiling in the range of about 96 to 211° F., which includes the steps of contacting the naphth with a carrier-based platinum metal reforming catalyst in the presence of hydrogen-rich gas at a temperature of about 800 to 1000° F., a pressure of about 150 to 250 p.s.i.g., a weight hourly space velocity of from about 2 to about 30, and a hydrogen feed rate of from about 2:1 to 10:1 moles hydrogen to moles hydrocarbon, separating the reaction effluent into a liquid reformate stream and a hydrogen-rich gas stream consisting essentially of hydrogen and $C_1$ to $C_2$ alkanes, recycling a portion of the hydroben-rich gas stream to the reforming step, contacting the gas oil with a hydrocracking catalyst in the presence of a hydrogen-rich gas including a substantial portion of the hydrogen-rich gas stream from the reforming step at a temperature of 500–600° F., a pressure of about 500 to 1500 p.s.i.g., a weight hourly space velocity of about 1 to 5 and a hydrogen feed rate of about 5:1 to about 20:1 moles hydrogen to moles hydrocarbon, separating the reaction effluent into a liquid hydrocracked gas oil stream and a hydrogen-rich gas stream consisting essentially of hydrogen and $C_1$ to $C_2$ alkanes, recycling the hydrogen rich gas stream to the hydrocracking step, combining the liquid hydrocracked gas oil stream and the liquid reformate stream, flashing the combined liquid stream at reduced pressure to form a flash liquid stream and a flash gas stream, subjecting the flash gas stream to absorption to produce a dry gas containing propane and lighter components, and fractionating the flash liquid stream to obtain an overhead fraction boiling primarily in the range from the $C_4$ boiling range up to about 350° F., at least one side stream boiling primarily in the range of from about 350° F. to about 525° F., and a bottoms fraction.

2. The process of claim 1 which further includes fractionating the flash liquid to obtain a sidestream fraction boiling primarily in the range from about 350° F. to about 460° F. and passing at least a portion of such fraction to the reforming step.

3. The process of claim 1 which further includes recycling at least a portion of the bottoms fraction to the hydrocracking step.

4. The process of claim 1 wherein the sidestream fraction boils in the range from about 350° F. to about 525° F.

5. The process of claim 1 which further includes fractionating the flash liquid to obtain a sidestream fraction boiling primarily in the range from about 350° F. to about 460° F. and a 460° F. + bottoms fraction, passing at least a portion of the sidestream fraction to the reforming step and passing at least a portion of the bottoms fraction to the hydrocracking step.

References Cited by the Examiner

UNITED STATES PATENTS

| | | | |
|---|---|---|---|
| 2,719,816 | 10/55 | Rich | 208—101 |
| 2,931,768 | 4/60 | Mathy | 208—101 |
| 3,008,895 | 11/61 | Hansford et al. | 208—112 |
| 3,018,244 | 1/62 | Stanford et al. | 208—79 |

ALPHONSO D. SULLIVAN, *Primary Examiner.*

UNITED STATES PATENT OFFICE
CERTIFICATE OF CORRECTION

Patent No. 3,210,264                         October 5, 1965

Stanley C. Haney

It is hereby certified that error appears in the above numbered patent requiring correction and that the said Letters Patent should read as corrected below.

Column 6, lines 24 and 25, for "hydroben-rich" read -- hydrogen-rich --; line 29, for "500-600" read -- 500-860 --.

Signed and sealed this 3rd day of May 1966.

(SEAL)
Attest:

ERNEST W. SWIDER                         EDWARD J. BRENNER
Attesting Officer                            Commissioner of Patents